Feb. 9, 1954 B. ROBERTS 2,668,674

DRIVE MECHANISM FOR MAGNETIC TAPE RECORD MACHINE

Filed April 26, 1947 2 Sheets-Sheet 1

INVENTOR
Bruce Roberts
BY
ATTORNEYS

Feb. 9, 1954 B. ROBERTS 2,668,674

DRIVE MECHANISM FOR MAGNETIC TAPE RECORD MACHINE

Filed April 26, 1947 2 Sheets-Sheet 2

INVENTOR
Bruce Roberts
BY
Lynnestvedt & Lechner
ATTORNEYS

Patented Feb. 9, 1954 2,668,674

UNITED STATES PATENT OFFICE 2,668,674

DRIVE MECHANISM FOR MAGNETIC TAPE RECORD MACHINE

Bruce Roberts, Philadelphia, Pa., assignor to The International Electronics Company, Philadelphia, Pa., a corporation of Pennsylvania Application April 26, 1947, Serial No. 744,272

11 Claims. (Cl. 242—55)

This invention relates to equipment for use with elongated magnetic records, especially such records in the form of a flexible paper tape carrying a coating having magnetizable particles dispersed therein. The invention is particularly concerned with tape translating or drive mechanism for a machine of the type referred to.

In equipment of the type mentioned, difficulty has been encountered as a result of periodic acceleration and deceleration of the tape, which, upon playback of a tape record, results in fluctuations of the frequency of the sound being reproduced. This undesirable condition is commonly referred to as "wow."

One of the primary objects of the invention is to provide a drive mechanism which is characterized by exceptional stability with respect to tape translation through the machine.

A further object of the invention is the provision of a novel reversing mechanism providing for constant speed translation of a tape record in either of two opposite directions.

In accordance with the invention, the driving mechanism comprises rotative friction driving devices including an intermediate drive member which is shiftable for reversal of the direction of drive, the arrangement of the parts being such as to be "self-energized," i. e., such that the driving action itself tends to tighten the frictional interengagement of the several drive elements in either direction of operation.

Still further, the invention has in view the provision of simple and effective control means coordinating the operations of various different parts of the equipment, as will further appear.

How the foregoing, together with other objects and advantages are attained, will appear more fully from the following description, referring to the accompanying drawings, in which.

Figure 1:
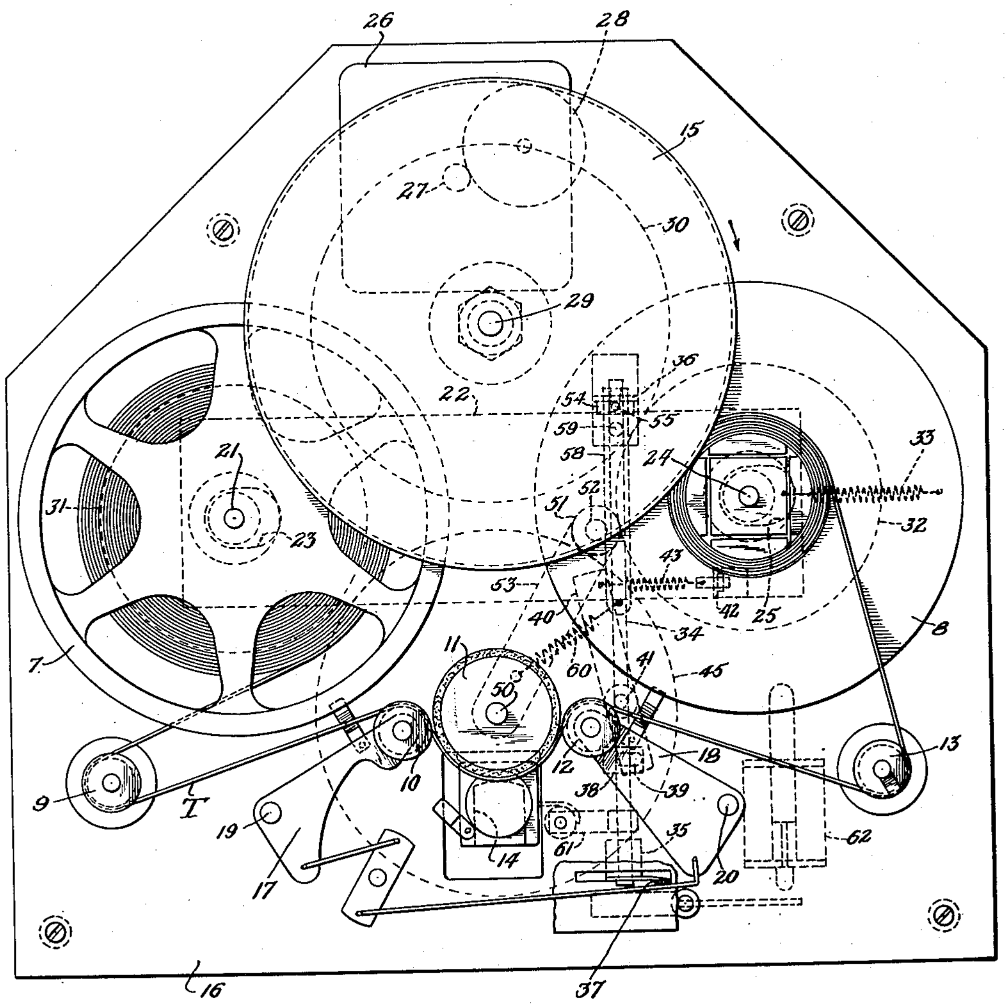
Figure 1 is a plan view of a machine constructed according to the present invention, certain parts being omitted and some shown in outline only for the sake of clarity.

Referring first to Figure 1, the machine, in general, comprises a pair of tape reels 7 and 8, between which a tape record such as indicated at "T" is adapted to be fed in either direction. The feed path is defined by the guide elements 9, 10, 11, 12 and 13, there being a magnetic scanning device 14 positioned adjacent the tape in the feed path between the reels. In the machine shown, this scanning device is adapted to engage the tape against the element 11, which constitutes the driving capstan for translating the tape between the reels and for maintaining constant translational speed.

As seen in Figure 1, the machine further includes a turntable 15 which is adapted to support the standard type of disc phonograph recordings. A typical machine to which the invention is applicable not only incorporates mechanism for handling magnetic tape records, but also mechanism for playback of standard phonograph records, as is disclosed not only in my copending application, Serial No. 715,518, filed December 11, 1946, now Patent No. 2,625,611, but also in the abandoned application of Frank J. Reed, Serial No. 742,776, filed April 21, 1946, which latter application has been replaced by continuation application Serial No. 368,172, filed July 15, 1953, all of said applications being assigned to the assignee of the present application. As disclosed in said copending applications, a typical machine of the character herein mentioned further includes a radio broadcast receiver and appropriate circuits, according to which either radio programs or disc recordings may be fed to the magnetic scanning device 14 to effect recording of such material on a tape record. The magnetic head 14 is also capable of alternative use as a pick-up or playback head for magnetic tape recordings.

It is further noted that a machine of the type with which the invention is particularly concerned is one adapted to the recording and the playing back of magnetic tape records carrying two side-by-side record tracks which are oppositely oriented lengthwise of the tape. Machines disclosed in said copending applications also have this capability. This type of operation contemplates that the tape reel 7 constitute a permanent storage reel for a given record, this reel being readily removable from and insertable in the machine. It is also contemplated that the tape reel 8 constitute a permanent part of the machine itself. With a tape carrying a typical recording, for instance, carrying half of a symphony recorded in one track and the other half in the other track, the two tracks being oppositely oriented, the tape is played back by first feeding the tape from reel 7 to reel 8 while scanning one track, and then feeding the tape in the reverse direction to return it to the reel 7 while scanning the other track. In this way, upon the completion of the playback of a tape record, the tape is completely returned to its permanent storage reel, thereby obviating the necessity for rewinding.

Referring again to the elements 9 to 13, inclusive, which define the feed path of the tape between the reels, it is mentioned that elements 9 and 13 constitute guide posts which are preferably fixed on the primary support or base plate 16 of the machine. Elements 10 and 12 constitute flanged rollers or non-rotative flanged guides carried on arms 17 and 18 which are pivoted at 19 and 20 to provide for swinging motion of the elements 10 and 12 toward and away from the tape driving capstan 11. Control means are provided for effecting swinging of the arms 17 and 18, but since these devices form no part of the present invention per se, they need not be considered herein. For further information, reference may be made to the copending application of Frank J. Reed, above referred to.

The spindle 21, on which the tape reel 7 is removably mounted, is carried by a transversely shiftable plate 22 arranged beneath the base plate 16, the spindle 21 extending through an elongated aperture 23 formed in the base plate 16. Similarly, spindle 24 for tape reel 8 is carried by the shift plate 22 from the spindle extended through an elongated aperture 25 formed in the base plate 16.

The drive mechanism for the turntable 15, the reel spindles and the tape driving capstan 11 includes a motor 26, with its shaft 27 engaging a driving puck 28 which in turn engages a peripheral flange on the turntable 15. The turntable shaft 29 carries a driving disc 30 from which drive to other parts is transmitted in the manner described below, with particular reference to Figures 2 and 3.

A drive disc 31 is associated with the reel spindle 21, disc 31 being adapted to be brought into engagement with the driving disc 30. Similarly, a disc 32, associated with reel spindle 24, is also adapted to be brought into engagement with the driving disc 30. In the position of the parts shown in Figure 2, the shift plate 22 occupies its left-hand position, in which the disc 32 is engaged with disc 30, and disc 31 is disengaged. The shift plate is normally urged toward the right by means of a spring 33, but is controllably shiftable toward the left (the position of Figure 2) by control mechanism described below.

A control shaft 34 is mounted for oscillation by means of bearing 35 at its forward end and by means of a bracket 36 at its inner end. Fixed to the control shaft is a control arm 37, which projects upwardly therefrom and through the base plate 16 (see also Figure 1). Control shaft 34 carries a collar 38 with a pin 39 projecting therefrom and engaging in an aperture formed in one end of the lever 40, which is pivoted at 41. The opposite end of the lever 40 is connected with a bracket 42 fixed to the shift plate 22, a spring 43 being interposed between the lever 40 and the bracket 42. With the parts in the position of Figure 3, the lever 40 is shifted to that position in which spring 33 acts to move the shift plate 22 to the right. In this position the disc 32 is disengaged from the driving disc 30 and disc 31 is engaged with disc 30. An eccentrically adjustable device indicated at 44 is arranged adjacent an edge of the shift plate 22 so as to prevent engagement of disc 31 with the capstan driving disc 45 described below.

Reel spindle 21 has fixed thereto a pulley 46, between which and the disc 31 a series of friction pads 47 is arranged. It is now pointed out that disc 31 is not fixed to the reel spindle 21, but is spring-pressed against the friction pads 47 in the manner more fully disclosed in the copending application of Frank J. Reed above identified. The pads 47 constitute a slip clutch between the disc 31 and the reel spindle 21, serving a purpose described more fully herebelow. A similar arrangement of parts is associated with reel spindle 24, including pulley 48 and friction pads 49.

Figures 2, 3:
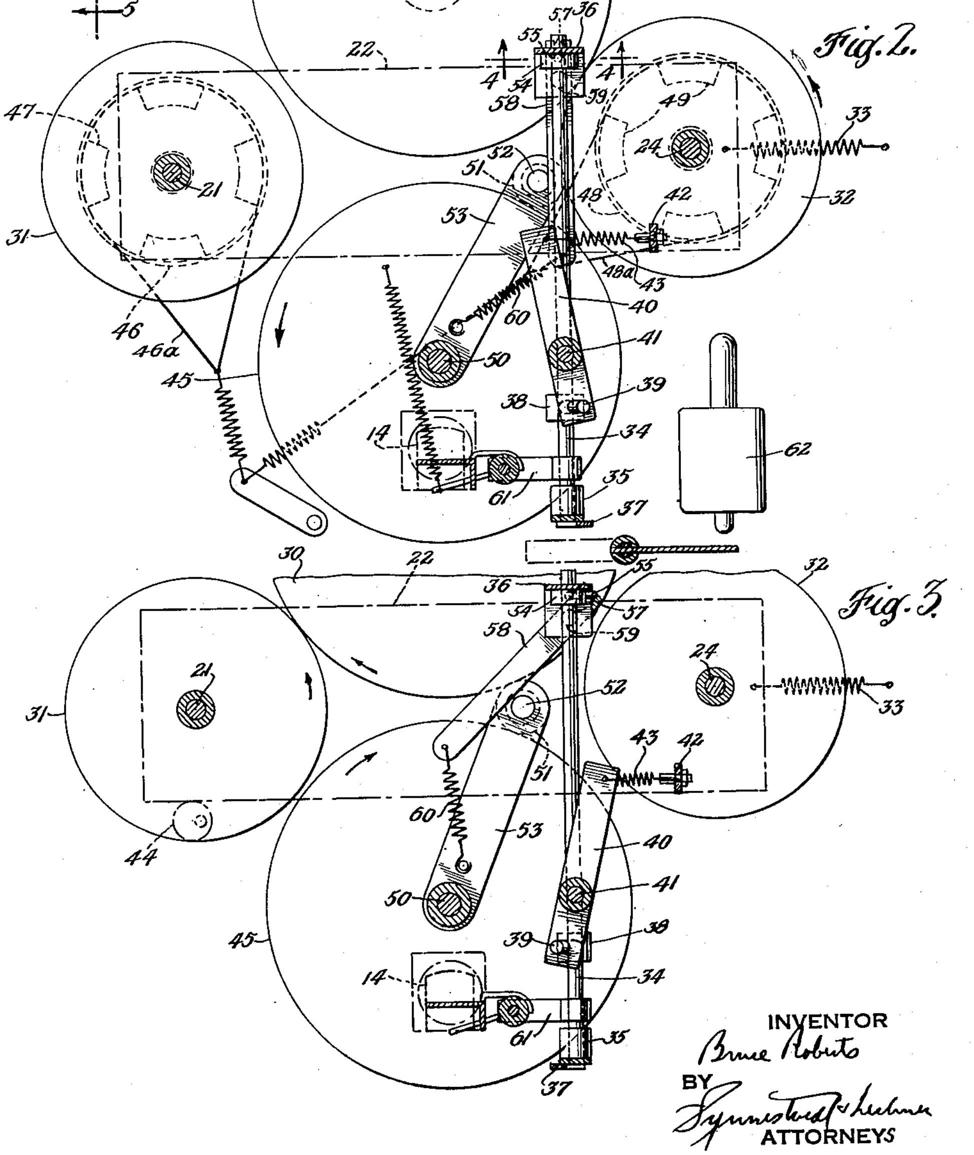
Figure 2 is a plan view of certain of the driving and control parts, these parts being adjusted for operation of the machine in one direction.
Figure 3 is a fragmentary view similar to Figure 2 but illustrating certain of the driving and control parts, adjusted for operation of the machine in the reverse direction.

The capstan driving disc 45, above referred to, is fixed on the capstan shaft 50 and is adapted to be driven by an intermediate drive element 51, which is journalled at 52 at the free end of an arm 53 which is pivotally carried by the capstan shaft 50. The intermediate drive element is adapted alternatively to interconnect discs 32 and 45, as shown in Figure 2, and discs 30 and 45, as shown in Figure 3.

Figure 4:
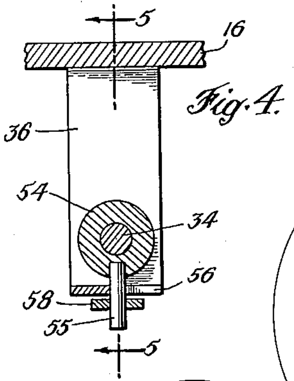
Figure 4 is a fragmentary sectional view taken as indicated by the section line 4—4 on Figure 2, but on an enlarged scale.
Figure 5:
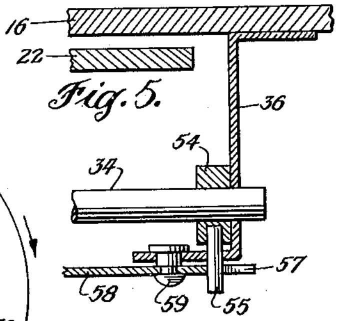
Figure 5 is a fragmentary sectional view taken as indicated by the section line 5—5 on Figure 4.

Mechanism is provided for shifting the arm 53 between the positions above referred to, such mechanism including actuating connections extended from the control shaft 34. Thus, as best seen in Figures 4 and 5, control shaft 34 has a collar 54 fixed thereto, with a pin 55 projecting downwardly from the collar and engaged in a slot 56 formed in a part of the bracket 36, the pin also extending downwardly for engagement in a slot 57 formed in one end of a lever 58 which is pivoted on bracket 36 by means of a pivot 59. The other end of lever 58 is connected by a spring 60 with the arm 53 and these parts constitute a toggle mechanism actuable between the positions of Figures 2 and 3. In the position of Figure 2, the spring 60 yieldingly urges the intermediate driving element 51 into engagement with the discs 32 and 45; whereas in the position of Figure 3, the spring 60 urges the intermediate driving element into engagement with the discs 30 and 45.

From the foregoing, it will be seen that oscillation of the control shaft 34 provides for coordinated control of the reel drive mechanism and of the capstan drive mechanism. With the turntable 15 and the driving disc 30 rotating in the direction indicated by the arrows in Figures 1 and 2, the position of the parts illustrated in Figure 2 provides for drive of the disc 32 and thus of the reel 8 in the direction indicated by the arrow on Figure 2 and at the same time for drive of the disc 45 and thus of the capstan 11 in the direction also indicated by an arrow on Figure 2. On the other hand, with the parts positioned as in Figure 3, the disc 31 and thus the reel 7 are driven in the direction indicated by the arrow, the capstan being at this time driven in the opposite direction to provide for translation of the tape in the direction from reel 8 to reel 7.

The drive for the reel spindles tends to overrun the capstan drive so as to retain the tape under some tension, but the slip clutches 47 and 49 permit the capstan to establish the tape driving speed.

The control shaft 34 is still further employed to shift the scanning head 14 from one track to the other, depending upon the direction of translation of the tape. For this purpose, the scanning device is mounted on a vertically shiftable support adapted to be controlled by an arm 61. This particular control feature, however, forms no part of the present invention per se, and is fully disclosed in the copending application of Frank J. Reed, above referred to.

Still other control features are desirably incorporated in the machine, including a solenoid shown at 62 for controlling movement of the arm or handle 37 which projects upwardly from the control shaft 34. However, it is here also noted that this control feature forms no part of the present invention per se, and is therefore not described fully herein. For further information, reference may be made to either one of the copending applications above referred to.

Note also that brake cords 46a and 48a are associated with the pulleys 46 and 48, these brakes being provided to prevent spinning of the reels 7 and 8 under certain conditions of operation, as more fully disclosed in the copending application of Frank J. Reed, above identified.

The drive mechanism for the tape driving capstan above fully described, is of especial advantage because of the stability of drive provided, and further because of the capability of ready shifting from one direction of drive to the other. With regard to the various interengaging friction members of the drive system, it is mentioned that they advantageously carry surfacing material, such as rubber, having a relatively high coefficient of friction.

It is of especial importance that the reversible capstan drive is of the "self-energizing" type, according to which, in either direction of drive, the intermediate drive element 51 engages the other drive elements in such position that the driving action itself tends to tighten the frictional engagement of the intermediate element.

It has been found that this self-energizing drive system is especially effective in eliminating wow, particularly with the parts arranged as illustrated, including the pivoting of the intermediate drive element about the axis of the capstan.

I claim:

1. In equipment for use with magnetic tape records and comprising a pair of reels and a rotative capstan adapted to engage a tape record to feed such record between the reels for scanning purposes, mechanism for alternatively rotating the capsan in either direction comprising a driven element connected with the capstan, a pair of driving elements adapted to rotate in opposite directions, and a shiftable intermediate drive element adapted alternatively to interconnect said driven element with either one of said driving elements, clutch devices respectively connecting said pair of driving elements with the reels all of said elements having friction driving surfaces and said intermediate drive element being shiftable into engagement with each of the driving elements at the side thereof at which rotation of the driving element tends to move the intermediate element into engagement with the driven element.

2. A construction according to claim 1 and further including a toggle type mechanism for shifting the intermediate drive element.

3. A construction according to claim 1 in which said intermediate element is mounted for pivotal shifting movement.

4. A construction according to claim 1 and further including a pivoted mounting member for the intermediate drive element providing for angular oscillation of the intermediate element about the axis of the driven element.

5. A construction according to claim 1 in which the axes of the driven element and the pair of driving elements are spaced and parallel, being located at the corners of a triangle, the arrangement further including a support for the intermediate element pivoted about the axis of the driven element.

6. In combination, a turntable for support of disc records, equipment for use with magnetic tape records, comprising a rotative capstan adapted to engage a tape record to advance such record for scanning purposes, and mechanism for alternatively rotating the capstan in either direction comprising a driven element connected with the capstan, a pair of driving elements, one being rotatable with the turntable and the other having driving connection therewith but being rotatable in the opposite direction, and a shiftable intermediate drive element adapted alternatively to interconnect said driven element with either one of said driving elements, all of said elements having friction driving surfaces and said intermediate drive element being shiftable into engagement with each of the driving elements at the side thereof at which rotation of the driving element tends to move the intermediate element into engagement with the driven element.

7. Equipment for use with magnetic tape records, comprising a pair of reels between which a tape is adapted to be fed, a uni-directional motor, a capstan engageable with a tape record intermediate said reels and maintaining constant translational speed thereof, reversible capstan drive mechanism between the motor and the capstan including means shiftable to provide for drive of the capstan alternatively in either direction, said mechanism in each direction of drive comprising a self-energizing friction transmission, reel drive mechanism comprising means shiftable to provide alternatively coupling of a first of said reels to and decoupling of the second reel from the motor and coupling of the second reel to and decoupling of the first reel from the motor, the reel drive mechanism tending to overrun the capstan drive mechanism but being yieldable, and a common control linked with the two shiftable means for joint shifting thereof.

8. Equipment for use with magnetic tape records, comprising a pair of reels between which a tape is adapted to be fed, reversible drive mechanism adapted to engage a tape record intermediate said reels and maintain constant translational speed thereof, means for alternatively driving one or the other of said reels to wind up a tape on either reel, the reel drive means and the tape drive mechanism comprising a driving disc, a pair of discs connected respectively with the reels and adapted alternatively to be driven from the driving disc, a tape drive disc, and an intermediate drive element shiftable to alternatively couple the tape drive disc with said driving disc and with one of said reel driving discs.

9. A construction according to claim 8 and further including common control means for said pair of reel driving discs and for said intermediate drive element.

10. Equipment for use with magnetic tape records, comprising a pair of reels between which a tape is adapted to be fed, a capstan for translating a tape at constant speed, and drive mechanism for the capstan and for the tape reels comprising a driving disc, a pair of discs connected respectively with the reels and adapted alternatively to be driven from the driving disc, a disc connected with the capstan, and an intermediate drive element having two conditions of adjustment in one of which the intermediate element connects the capstan disc with the driving disc and in the other of which the intermediate element connects the capstan disc with one of said reel discs.

11. A construction according to claim 10 and further including common control means for said pair of reel discs and for said intermediate drive element.

BRUCE ROBERTS.

References Cited in the file of this patent

UNITED STATES PATENTS

| Number | Name | Date |
|---|---|---|
| 446,927 | Richards | Feb. 24, 1891 |
| 858,847 | Allen | July 2, 1907 |
| 1,439,058 | Baeseler | Dec. 19, 1922 |
| 1,845,462 | Wellman | Feb. 16, 1932 |
| 1,926,862 | Wellman | Sept. 12, 1933 |
| 1,950,692 | Owens | Mar. 13, 1934 |
| 2,084,947 | Czeija | June 22, 1937 |
| 2,096,805 | Hickman | Oct. 26, 1937 |
| 2,191,554 | Bennett | Feb. 27, 1940 |